(12) United States Patent
Sasaki et al.

(10) Patent No.: US 10,354,856 B2
(45) Date of Patent: Jul. 16, 2019

(54) DISCHARGE LAMP

(71) Applicant: USHIO DENKI KABUSHIKI KAISHA, Tokyo (JP)

(72) Inventors: Yuichi Sasaki, Tokyo (JP); Takumi Yamane, Tokyo (JP)

(73) Assignee: USHIO DENKI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/095,909

(22) PCT Filed: Apr. 12, 2017

(86) PCT No.: PCT/JP2017/014978
§ 371 (c)(1),
(2) Date: Oct. 23, 2018

(87) PCT Pub. No.: WO2017/187987
PCT Pub. Date: Nov. 2, 2017

(65) Prior Publication Data
US 2019/0172698 A1  Jun. 6, 2019

(30) Foreign Application Priority Data

Apr. 28, 2016  (JP) .................................. 2016-090273

(51) Int. Cl.
*H01J 61/30*  (2006.01)
*H01J 61/16*  (2006.01)
(Continued)

(52) U.S. Cl.
CPC .............. *H01J 61/30* (2013.01); *H01J 61/16* (2013.01); *H01J 61/36* (2013.01); *C03B 2201/075* (2013.01); *H01J 61/04* (2013.01)

(58) Field of Classification Search
CPC .. H01J 61/30; H01J 61/36; H01J 61/16; H01J 61/04; H01J 2201/075
See application file for complete search history.

(56) References Cited

U.S. PATENT DOCUMENTS 3,858,078 A * 12/1974 Koury ................... H01J 61/827
313/634
4,281,267 A * 7/1981 Johnson .................. H01J 61/35
313/25

(Continued)

FOREIGN PATENT DOCUMENTS

JP   H06-231732 A   8/1994
JP   2003-201125 A  7/2003
(Continued)

OTHER PUBLICATIONS

International Search Report issued in PCT/JP2017/014978; dated Jun. 13, 2017.

*Primary Examiner* — Joseph L Williams
*Assistant Examiner* — Jose M Diaz
(74) *Attorney, Agent, or Firm* — Studebaker & Brackett PC

(57) ABSTRACT

A discharge lamp includes a discharge vessel. A xenon gas is sealed within the discharge vessel so as to serve as a light emitting gas, the discharge vessel is made from quartz glass, a pair of electrodes are arranged so as to face each other in the discharge vessel, and the discharge vessel has a chip portion. The chip portion is made from a glass member that has a composition different from that of the discharge vessel, and the glass member has a transmittance of 50% or more over a wavelength range from 170 nm to 300 nm.

6 Claims, 3 Drawing Sheets

(51) Int. Cl.
    *H01J 61/36*    (2006.01)
    *H01J 61/04*    (2006.01)

(56) References Cited

U.S. PATENT DOCUMENTS

| | | | | |
|---|---|---|---|---|
| 4,687,453 A | * | 8/1987 | Lekebusch | H01J 9/34 |
| | | | | 313/318.03 |
| 5,055,740 A | * | 10/1991 | Sulcs | H01J 61/30 |
| | | | | 313/621 |
| 6,857,926 B1 | * | 2/2005 | Sulcs | C03B 23/0496 |
| | | | | 313/634 |
| 2015/0364317 A1 | * | 12/2015 | Tanino | H01J 61/26 |
| | | | | 313/492 |
| 2018/0082830 A1 | * | 3/2018 | Ellis | H01J 9/247 |

FOREIGN PATENT DOCUMENTS

| | | |
|---|---|---|
| JP | 2005-310455 A | 11/2005 |
| JP | 2008-030988 A | 2/2008 |
| JP | 3142251 U | 5/2008 |
| JP | 2008-192351 A | 8/2008 |

* cited by examiner

<TABLE 1>

| NAME OF TYPICAL DEFICIENCY | STRUCTURE | ABSORBED WAVELENGTH(nm) |
|---|---|---|
| OXYGEN DEFICIENT CENTER [ODC(I)] | ≡Si–Si≡ | 163nm |
| OXYGEN DEFICIENT CENTER [ODC(II)] | ≡Si  Si≡ | 245nm |
| PEROXY LINKAGE [POL] | ≡Si–O–O–Si≡ | 160~180nm |
| NON-BRIDGING OXYGEN HOLE CENTER [NBOHC] | ≡Si–O · | 260nm (190~280nm) |

DISCHARGE LAMP

TECHNICAL FIELD

The present invention relates to a discharge lamp for use with projection-type projectors, other types of projectors, and general illumination devices. In particular, the present invention relates to a discharge lamp in which a xenon gas is sealed and used as a light emitting gas.

BACKGROUND ART

Nowadays, a discharge lamp (xenon lamp) that emits light upon excitation of a xenon gas (Xe gas) is used as the discharge lamp disposed in the above-mentioned devices. It is known that this discharge lamp has a continuous spectrum from an ultraviolet range to a near infrared range, and particularly has a distribution that is very close to natural daylight in a visible range.

In a manufacturing process of such discharge lamp, an evacuation pipe or air-exit pipe (chip pipe) is connected to a discharge vessel to expel an impurity gas from the discharge vessel and introduce a light emitting gas into the discharge vessel. After the light emitting gas is introduced into the discharge vessel, the chip pipe is melted and removed while the sealing is being maintained (chip off step). Some portion of the chip pipe (hereinafter referred to as "chip portion") remains on the outer peripheral surface of the discharge vessel.

The above-mentioned discharge lamp filled with the xenon gas primarily emits light from an ultraviolet range to a near infrared range. However, as shown in FIG. 6 (energy diagram of a xenon lamp) of the accompanying drawings, the lamp also emits light in a vacuum ultraviolet range. In FIG. 6, it should be noted that light at the wavelength of 147 nm is hardly emitted because of self-absorption by a gas, but light at the wavelength of 172 nm is relatively easily emitted, and this light is absorbed by the discharge vessel with high probability.

Silica glass that is a material of the discharge vessel experiences an accumulation of ultraviolet-derived distortion and/or stress (distortion and/or stress caused by ultraviolet light) over time as the discharge vessel absorbs the ultraviolet light. In particular, the remaining portion of the evacuation pipe, i.e., the chip portion, has a low mechanical strength because of the structure thereof, and is easy to accumulate the distortion and/or stress. Thus, the chip portion is a portion that is easiest to break upon accumulation of the ultraviolet-derived distortion and/or stress over time. The "distortion and/or stress" is referred to "stress" in the following description.

To address such ultraviolet-derived stress, Japanese Patent Application Laid-Open Publication No. Hei. 6-231732 (Patent Literature Document 1), for example, teaches increasing an OH group (OH radical) concentration contained in silica glass, which is the material of the discharge vessel, to suppress or reduce a damage caused by the ultraviolet light. The ultraviolet-derived stress is generated when the molecular binding (Si—O) in the silica glass is disconnected by the ultraviolet light and a structural change takes place. If the OH group concentration in the silica glass is high, it works to fix (repair) the disconnected molecular binding. As a result, the ultraviolet-derived stress is moderated.

In recent years, the Xe lamp for use in a movie theater emits light with a rated electric power and also changes the electric power on the basis of the use. For example, the lamp must emit light at a higher electric power when it is used to project the 3D movie than when it is used to project the 2D movie. However, when the lamp is used to project the 2D movie, an amount of its optical output is too high, and therefore it is necessary to reduce the electric power to be used by the lamp.

In view of the above-described fact that use of the discharge lamp spreads in a variety of applications nowadays, there is a demand for a discharge lamp that has a wide (large) acceptable range of electric power. For example, there is a demand for a discharge lamp that can properly emit light from a rated value to a 50% of the rated value. When such discharge lamp is designed, the magnitude, the size and other factors of the optical output, the electrodes, the sealing body of the discharge lamp are decided on the basis of the upper limit of the electric power to be used.

However, the extensive study of the inventor of this invention revealed that the chip portion connected to the discharge vessel tends to more accumulate the stress when the discharge lamp filled with the xenon gas emits light at low electric power than when the discharge lamp filled with the xenon gas emits light at high electric power. The inventor considers that this is because the temperature of the discharge vessel (sealing body temperature) during the light emission of the discharge lamp is different.

Specifically, the sealing body temperature becomes high when the discharge lamp emits light upon receiving a high electric power, and the atom migration (atom transfer) becomes active inside the material. This works to moderate (reduce) the accumulated stress. On the other hand, when the discharge lamp emits light upon receiving a low electric power, the sealing body temperature becomes relatively low. This lowers the capability of moderating the stress. As a result, the damage caused by the stress tends to remain in the material. In particular, the accumulation of the ultraviolet-derived stress at the chip portion becomes one of major factors of shortening the life (duration) of the discharge lamp and causing the breakage of the discharge vessel. Thus, an appropriate solution to this problem is desired.

LISTING OF REFERENCES

Patent Literature Documents

PATENT LITERATURE DOCUMENT 1: Japanese Patent Application Laid-Open Publication No. Hei 6-231732

SUMMARY OF THE INVENTION

Problems to be Solved by the Invention

In view of the above-described facts, an object of the present invention is to provide a discharge lamp that can suppress the ultraviolet-derived stress accumulated in the chip portion, which is formed on the discharge vessel of the discharge lamp.

Solution to the Problems

In order to achieve the above-mentioned object, a discharge lamp according to one aspect of the present invention includes a discharge vessel having a chip portion, the chip portion is made from a glass member that has a composition different from that of the discharge vessel, and the glass member has a transmittance of 50% or more over the entire wavelength range from 170 nm to 300 nm.

The discharge vessel may be made from fused silica glass, and the chip portion may be made from a synthetic silica glass.

Advantageous Effects of the Invention

In the discharge lamp of the present invention, the glass member that constitutes the chip portion has a transmittance of 50% or more in the entire wavelength range from 170 nm to 300 nm. It is possible to avoid the absorption of the ultraviolet light at the chip portion as the transmittance of the light from the vacuum ultraviolet range to the ultraviolet range is raised. This suppresses the accumulation of the ultraviolet-derived stress.

DESCRIPTION OF EMBODIMENTS

Figure 1:
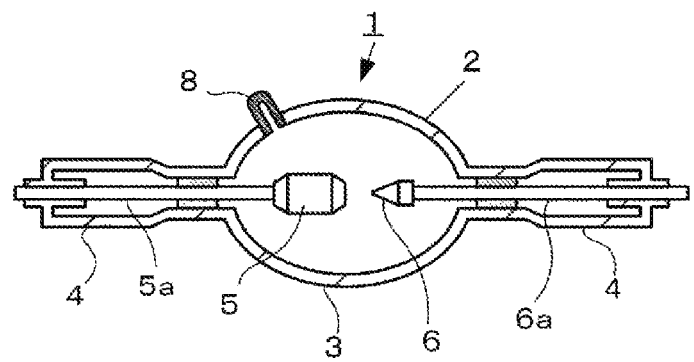
FIG. 1 is a cross-sectional view of a discharge lamp according to an embodiment of the present invention.

FIG. 1 shows a schematic view of a discharge lamp according to an embodiment of the present invention.

The discharge lamp 1 includes a light emitting part 3, which serves as a discharge vessel 2 and is made from fused silica glass, and sealing parts 4 and 4 disposed at opposite ends of the light emitting part 3. In the light emitting part 3, arranged is a pair of an anode 5 and a cathode 6 that face each other.

Core wires (conductors) 5a and 6a of the anode 5 and the cathode 6 are sealed by the sealing parts 4 and 4, respectively. A xenon gas, which is used as a light emitting gas, is sealed in the light emitting part 3. The xenon gas is excited upon discharging across the electrodes 5 and 6 such that the xenon gas (or the light emitting part) emits light that has a natural daylight spectrum.

The discharge vessel 2 has a chip portion 8, which is a remaining portion of an evacuation pipe, at a certain position of the discharge vessel 2. In this embodiment, the chip portion 8 is formed on an outer peripheral surface of the light emitting part 3. The chip portion 8 is formed during the manufacturing process of the discharge lamp. The evacuation pipe (chip pipe) is provided to expel an impurity gas from the discharge vessel 2 and introduce the light emitting gas into the discharge vessel 2. The chip portion 8 is a remaining portion of the evacuation pipe that is left after the evacuation pipe is melted and removed while the sealing is maintained (i.e., that is left upon the completion of the manufacturing process).

As described above, the quartz glass (silica glass), which constitutes the discharge vessel 2, experiences the ultraviolet-derived stress due to the ultraviolet light generated in the discharge vessel 2. The following passages will describe the ultraviolet-derived stress.

Figures 6, 7:
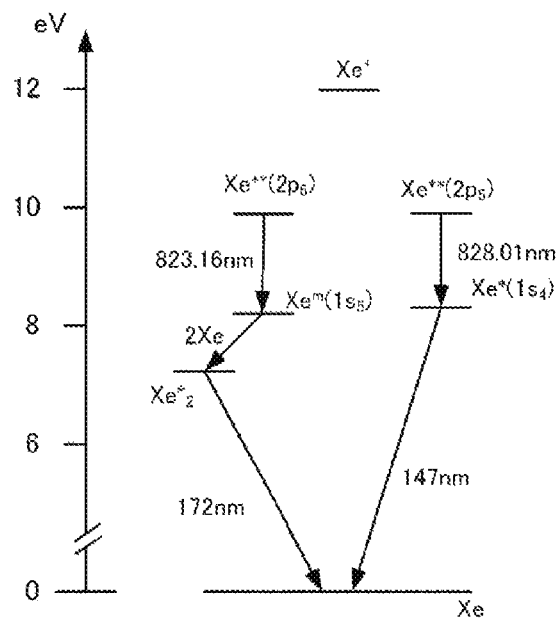
FIG. 6 is an energy diagram of a xenon lamp.
FIG. 7 is a table to show relationship between oxygen deficiency and absorbed wavelength in quartz glass.

The quartz glass is an amorphous material having a plurality of base units, i.e., $SiO_4$ tetrahedrons, in which $SiO_4$ tetrahedrons are coupled to each other such that Si—O—Si coupling overlaps, thereby making a net-like (mesh-like) three-dimensional structure. If defects are present in the quartz glass, the wavelength range of the light absorbed by the glass changes. The defects include, for example, oxygen deficient center which occurs when some oxygen becomes insufficient in the coupling of Si—O—Si, and peroxy linkage which occurs when oxygen is present excessively. Typical wavelength absorption caused by such defects is shown in Table 1 of FIG. 7.

It is considered that the defects in the quartz glass are generated due to the presence of impurity substances in the glass and/or disconnection of the Si—O coupling by light.

The ultraviolet-derived stress in the quartz glass depends on the degree of absorption of the ultraviolet light by the glass (how much ultraviolet light is absorbed by the glass). As shown in Table 1, it is assumed that the light absorption primarily takes place in the wavelength range below 300 nm, inclusive, and such light absorption facilitates generation of the ultraviolet-derived stress.

In this embodiment, the chip portion 8 is made from a glass member that has a transmittance equal to or greater than 50% between the wavelength of 170 nm and the wavelength of 300 nm. This advantageously suppresses the accumulation of the ultraviolet-derived stress because the light from the vacuum ultraviolet range to the ultraviolet range at the wavelength equal to or shorter than 300 nm, which triggers the ultraviolet-derived stress in the glass member, passes through the chip portion 8. As a result, it is possible to prevent the breakage of the discharge lamp.

It should be noted that the lower limit of the wavelength range is 170 nm because the discharge lamp of this embodiment is a xenon lamp in which a xenon gas is sealed as the light emitting gas. More specifically, it is because the light in the vacuum ultraviolet range (light at the wavelength equal to or shorter than 200 nm) is hardly emitted, but the peak light emission takes place at the wavelength of 172 nm and therefore 170 nm is included as the indicator (index) for the light transmittance.

It is preferred that the discharge vessel of this embodiment is made from fused quartz glass, and the material to be used for the chip portion is the quartz glass that has various metallic impurities in an amount equal to or less than 1 ppm. It is preferred that the fused quartz glass having such extremely high purity is used. When an amount of the contained metallic impurities is equal to or less than 1 ppm, it is possible to more effectively increase the transmittance in an entire wavelength from 170 nm to 300 nm. If the glass member contains the metallic impurities over 1 ppm, the metallic impurities increase the possibility that the glass member absorbs the light in the deep ultraviolet range. This may become a major factor of deterioration of the transmittance. It should be noted that synthetic quartz glass may be used.

It should be noted that the light transmittance of the glass member is influenced by the concentration of the OH group contained in the glass member. When the concentration of the OH group is too high, it becomes a factor of deterioration of the transmittance at a wavelength equal to or shorter than 200 nm. Therefore, it is preferred that the concentration of the OH group of the glass member is restricted to or less than 400 ppm at maximum. On the other hand, the OH group in the glass member functions to repair the structural defects in the glass member and moderate the stress. Thus, if the concentration of OH group is too low, the stress is easy to accumulate. Accordingly, it is preferred that the concentration of OH group is equal to or greater than 100 ppm at minimum. For the above-described reasons, it is preferred that the glass member that makes up the chip portion has the OH group concentration in a range of 100 ppm-400 ppm.

Figure 4:
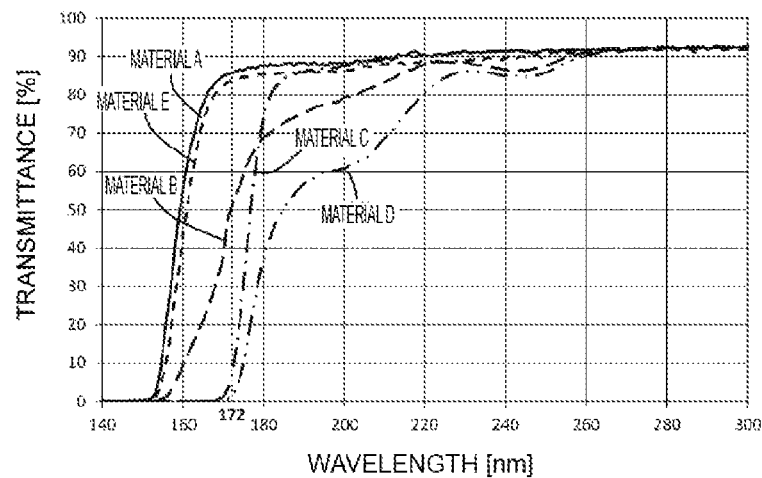
FIG. 4 is a graph showing correlation between the wavelength and transmittance of various materials.

An evaluation experiment was carried out with four kinds of material to know the influence of ultraviolet-derived stress in the quartz glass. FIG. 4 shows the relationship between the wavelength and the transmittance of each of the materials. The materials were selected to have different transmittances at the wavelength around 172 nm, and the relative stress intensity of the materials was measured, respectively. In this experiment, the material A was F310 (Shin-Etsu Quartz Products Co., Ltd), the material B was HX-LA (Shin-Etsu Quartz Products Co., Ltd), the material C was GE02AL (General Electric Company), the material D was GE214 (General Electric Company), and the material E was a high-purity fused quartz glass that had metallic impurities equal to or less than 1 ppm (Tosoh Corporation).

In this experiment, the wavelength of 172 nm was selected as the indicator for the transmittance. Because the light having a wavelength longer than 172 nm shows a tendency that the light is easier to pass through the material, the inventor observed the transmittance at the wavelength of 172 nm to know the relationship between the transmittance of the ultraviolet light and the ultraviolet-derived stress accumulated in the glass.

Among the observed materials, the materials A and B had the transmittance equal to or over 50% at the wavelength of 172 nm, and the materials C and D had the very low transmittance, i.e., no greater than 10%.

Figure 5:
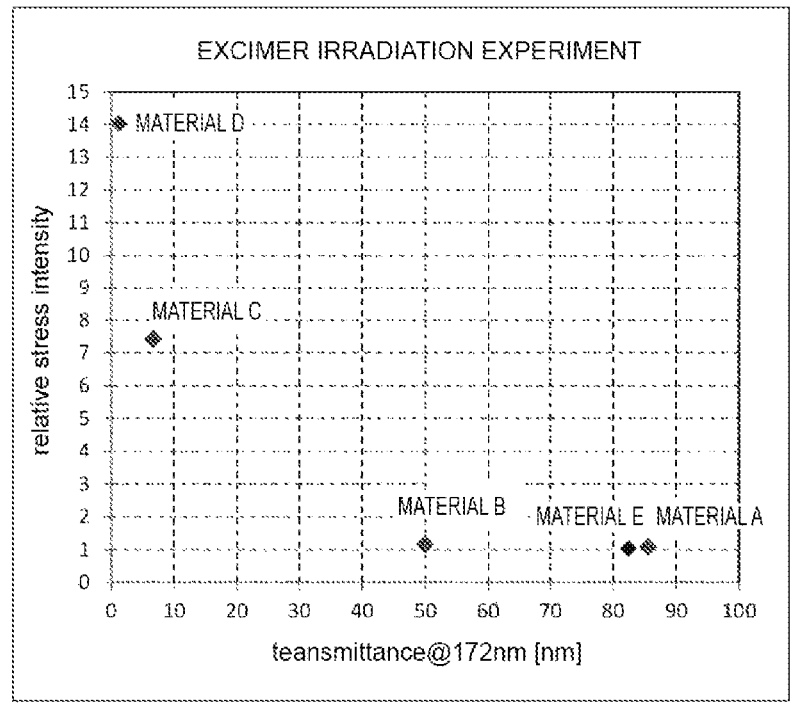
FIG. 5 is a graph showing correlation between the transmittance and relative stress intensity of various materials.

FIG. 5 shows the correlation diagram, with the vertical axis indicating the relative stress intensity (arb. unit) and the horizontal axis indicating the transmittance (indicator being a wavelength of 172 nm).

The experiment conditions: An excimer lamp was used, materials A to D were irradiated with light at a wavelength of 172 nm for 400 hours. Changes in stress were measured. In FIG. 5, the vertical axis indicates a ratio of the stress before the ultraviolet light irradiation to the stress after the ultraviolet light irradiation (hereinafter, referred to as "relative stress intensity"). As depicted in the drawing, those substances (materials A and B) which had transmittance of 50% or more at the wavelength of 172 nm showed an extremely low relative stress intensity. No accumulation of the ultraviolet-derived stress was observed. On the other hand, it was observed that those substances (materials C and D) which had transmittance of less than 50% at the wavelength of 172 nm showed a large amount of accumulation of the ultraviolet-derived stress as the transmittance was deteriorating. It should be noted that all the glass members made from the materials A-D showed the tendency that the light having a wavelength longer than 172 nm were more transmitted through the glass members. Thus, when the transmittance at the wavelength of 172 nm is 50% or more, it is natural that the transmittance of the light having a longer wavelength than 172 nm is never smaller than 50%.

From the above-described results, it is understood that the accumulation of the ultraviolet-derived stress at the chip portion is extremely small when the glass material of the chip portion is a glass member that has a different composition from the discharge vessel, and the glass member has a transmittance equal to or greater than 50% in an entire wavelength range from 170 nm to 300 nm. Thus, it is also understood that obtained is the discharge lamp that has no possibility of cracking and breakage from the chip portion.

Figure 2:
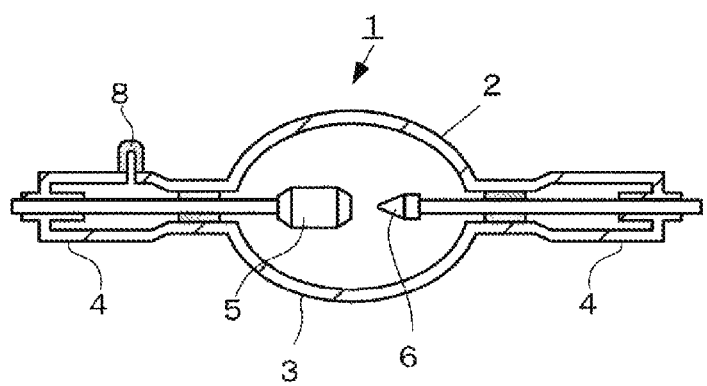
FIG. 2 is a cross-sectional view of another embodiment of the present invention.

FIG. 2 shows another embodiment of the present invention. In this embodiment, the chip portion 8 is formed on the sealing part 4 of the discharge vessel 2.

Figure 3:
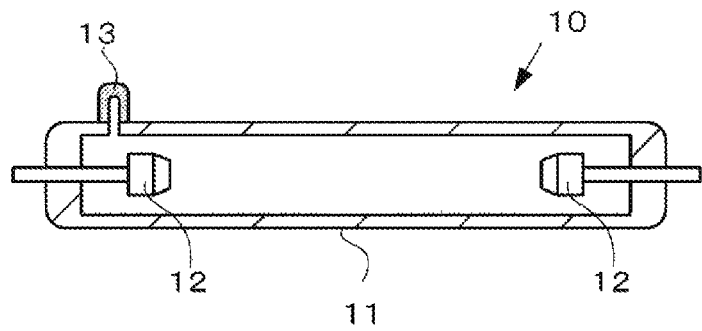
FIG. 3 is a cross-sectional view of still another embodiment of the present invention.

FIG. 3 shows still another embodiment of the present invention. This embodiment is directed a long arc type discharge lamp whereas the embodiments shown in FIGS. 1 and 2 are generally directed to a short arc type discharge lamp.

The long arc type discharge lamp 10 includes an elongated discharge vessel 11, and a pair of electrodes 12 and 12 in the discharge vessel 11 such that the electrodes 12 and 12 face each other. A chip portion 13 is formed on the discharge vessel 11.

REFERENCE NUMERALS AND SYMBOLS

1: (Short arc type) discharge lamp
2: Discharge vessel
3: Light emitting part
4: Sealing part
5: Anode
5a: Anode core wire
6: Cathode
6a: Cathode core wire
8: Chip portion
10: (Long arc type) discharge lamp
11: Discharge vessel
12: Electrode
13: Chip portion

The invention claimed is:

1. A discharge lamp for use with a projector or a general illumination device, the discharge lamp comprising a discharge vessel such that a xenon gas is sealed within the discharge vessel so as to serve as a light emitting gas, the discharge vessel being made from quartz glass, a pair of electrodes being arranged so as to face each other in the discharge vessel, and the discharge vessel having a chip portion and a light emitting part,
   the chip portion being disposed on an outer peripheral surface of the light emitting part of the discharge vessel, and made from a glass member that has a composition different from the discharge vessel, and the glass member of the chip portion having a transmittance of 50% or more over an entire wavelength range from 170 nm to 300 nm.

2. The discharge lamp for use with a projector or a general illumination device according to claim 1, wherein the chip portion is made from quartz glass that contains metallic impurities 1 ppm or less.

3. The discharge lamp for use with a projector or a general illumination device according to claim 1, wherein a concentration of an OH group of the glass member that constitutes the chip portion is between 100 ppm and 400 ppm.

4. The discharge lamp for use with a projector or a general illumination device according to claim 2, wherein a concentration of an OH group of the glass member that constitutes the chip portion is between 100 ppm and 400 ppm.

5. The discharge lamp for use with a projector or a general illumination device according to claim 1, wherein the quartz glass of the discharge vessel has a greater capability of absorbing ultraviolet light than the glass member of the chip portion, and
   the glass member of the chip portion only has a transmittance of 50% or more over an entire wavelength range from 170 nm to 300 nm.

6. The discharge lamp for use with a projector or a general illumination device according to claim 5, wherein the discharge vessel is made from fused quartz glass, and the chip portion is made from synthetic quartz glass.

* * * * *